H. RAY.

Assignor to WYCKOFF, SEAMANS & BENEDICT.

INKING RIBBON SPOOL FOR TYPE WRITING MACHINES.

No. 11,097. Reissued July 22, 1890.

Attest:

Sidney P. Hollingsworth

Horace A. Dodge.

HARVEY RAY

Inventor:

by Dodge & Sons,

Attorneys

UNITED STATES PATENT OFFICE.

HARVEY RAY, OF MOBILE, ALABAMA, ASSIGNOR TO WYCKOFF, SEAMANS & BENEDICT, OF NEW YORK, N. Y.

INKING-RIBBON SPOOL FOR TYPE-WRITING MACHINES.

SPECIFICATION forming part of Reissued Letters Patent No. 11,097, dated July 22, 1890.

Original No. 401,856, dated April 23, 1889. Application for reissue filed November 29, 1889. Serial No. 331,987.

*To all whom it may concern:*

Be it known that I, HARVEY RAY, a citizen of the United States, residing at Mobile, in the county of Mobile and State of Alabama, have invented now and useful Improvements in Inking-Ribbon Spools for Type-Writing Machines, of which the following is a specification.

My invention relates to inking-ribbon spools for type-writing machines, and has for its object to provide simple inexpensive spools of this character, which will allow separate manufacture and transportation of the inking-ribbons by mail or otherwise, and in such manner that the ribbons may be very quickly and easily adjusted to the type-writer and allow interchange of a series of inking-ribbons of various colors with but a single set of ribbon-spools fitted to the machine.

The invention will first be particularly described, and then pointed out in the claims.

Reference is to be had to the accompanying drawings, forming part of this specification, in which—

Figure 1:
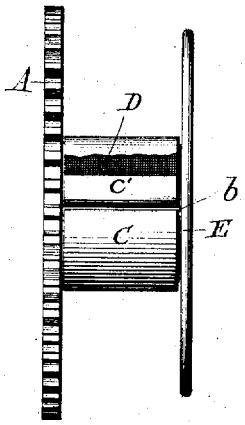
Figure 2:
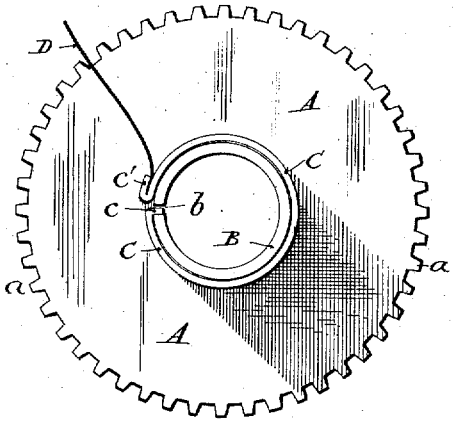
Figure 3:
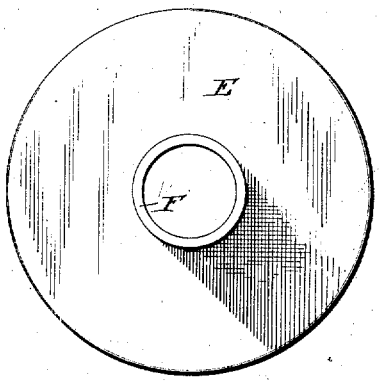
Figure 4:
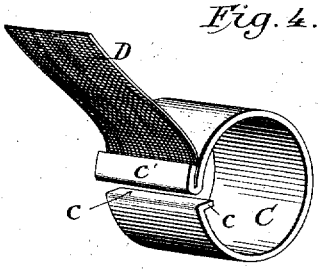
Figure 5:
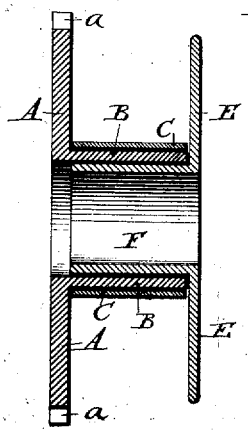

Figure 1 is an edge view of my improved inking-ribbon spool with a small piece of the ribbon held on the bobbin of the spool. Fig. 2 is an inside face view of one side part of the spool with the bobbin on the hub and a part of the inking-ribbon attached. Fig. 3 is an inside face view of the other part of the ribbon-spool. Fig. 4 is a perspective view of the bobbin with a portion of the attached inking-ribbon, and Fig. 5 is a central transverse section through the spool.

One side A of the ribbon-spool is shown provided with peripheral teeth *a*, with which mechanism of the type-writer engages for turning the spool to carry a new or fresh part of the inking-ribbon to the point of impression of the type; but the spool may receive motion for this purpose in any approved way. On the side of A is fixed a hub B, which is slotted lengthwise at *b* to receive an inwardly-bent tongue *c* of the inking-ribbon bobbin C, which consists of a plate of metal or other suitable material bent around from its tongue *c* to fit loosely upon the hub B, and at its other end part is bent upon itself to form a clamp *c'*, into which the end of the inking-ribbon D is fastened, as shown most clearly in Figs. 2 and 4 of the drawings. The other side part E of the spool is provided with a hub F, which fits snugly inside of the hub B of the side A and against the end of the bobbin, as will be understood from Figs. 1 and 5 of the drawings. The side plates A E thus form walls, between which the inking-ribbon will be held truly edgewise. The ribbon D will be wound upon the bobbin C and upon itself, and may have any required length up to the full capacity of the spool.

It is obvious that by removing the side portion E F from the opposite side part A B the bobbin, with the ribbon wound on it, may be slipped from the hub B of side A, and another bobbin carrying a fresh ribbon of the same color or of a different color may be quickly placed on the hub B and the side E F readjusted, and when the free end of the ribbon is secured to an opposite spool the type-writer is ready for operation; hence the advantages of the spool are evident, as inking-ribbons may be quickly and easily substituted one for the other without soiling the fingers, and two or more different colors of inking-ribbon can be used on the same spool, thus allowing a variety of inking-ribbons to be used interchangeably on the type-writer with but one set of spools, and the ribbons wound on the bobbins can be furnished by the manufacturer at little expense, and they may be sent by mail or otherwise at a trifling cost, thereby promoting the economical maintenance of the type-writing machine in good order for a wide range of work.

Prior to my invention it has been necessary either to unwind one ribbon from the ribbon-spools and wind another in its place or to substitute one pair of spools for another whenever a change of ribbons has been required. As is well known to those accustomed to the use of type-writing machines, the operation of unwinding one ribbon from the spools and winding another in its place is not only tedious, but even with the special appliances provided for the purpose, is inevitably attended with the staining of the fingers to such an extent that it is difficult to remove the ink from them. The loss of time is a serious objection to the making of the substitution. The employment of additional spools not only involves additional expense, but requires space for storage and increases the labor of adjusting the parts to position. When several kinds of ribbon are required to be used interchangeably, these difficulties become more noticeable. Thus, for instance, three ribbons would necessitate six spools instead of the two, with which the machine is furnished, yet three is, in fact, a small number of kinds of ribbon to be kept for use with one machine. Add to this an extra set to replace the originals when worn and the number of spools becomes so large as to be utterly out of the question.

With some machines it is at present customary to send a spool or pair of spools with the ribbon upon it or them to replace a spool or spools removed.

Inasmuch as manufacturers or dealers cannot know as to the responsibility of all the many users of machines scattered over the country, they naturally require the displaced spools to be returned before others are sent to take their place, from which it often results that a machine will be out of condition for use for a considerable length of time.

My invention enables me to substitute one ribbon for another in a few seconds, and to ship the coiled ribbons from point to point, ready for instant application, without duplicating the spools and without exchanging them, and thus I attain in a very simple, cheap, and efficient manner a result long desired, but not before reached so far as I am aware.

Having thus described my invention, what I claim as new, and desire to secure by Letters Patent, is—

1. An inking-ribbon bobbin provided with a clamp on its outer surface and with an inwardly-extending projection on its inner surface, substantially as described.

2. The inking-ribbon bobbin C, formed of a plate bent into cylindrical form and provided at one end with an inbent lip *c* and at the other end with a ribbon-clamp *c'*, substantially as shown and described.

3. The inking-ribbon bobbin C, provided at one end with an inbent lip *c* and at its other end with a clamp *c'*, combined with an inking-ribbon D, held at one end by the clamp *c'* and wound upon the bobbin, substantially as herein set forth.

4. The combination, in an inking-ribbon spool for a type-writer, of a side part A, having a hub B slotted at *b*, a bobbin C, fitted to said hub and having a tongue *c* entering said slot and adapted to hold the end of the inking-ribbon, and an opposite side part E, having a hub F fitting the hub B of part A, substantially as described, for the purposes set forth.

5. An inking-ribbon spool for a type-writer, consisting of two side parts and an intermediate bobbin, the side parts and the bobbin being separable one from another, substantially as set forth.

6. In combination with a spool composed of two separable parts, adapted to be applied to a type-writer and put into gear with the ribbon-feeding mechanism thereof, a detachable bobbin, and an inking-ribbon wound upon said bobbin.

HARVEY RAY.

Witnesses:
E. W. FOWLER,
W. L. NEWHOUSE.